United States Patent Office 3,079,110
Patented Feb. 26, 1963

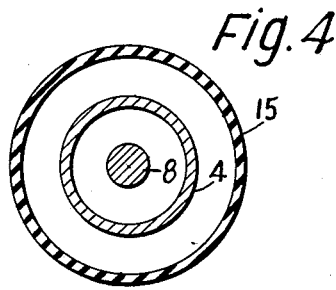
Fig. 4
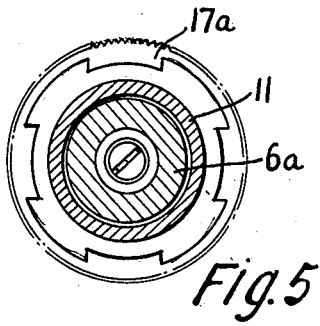
Fig. 5
Fig. 6
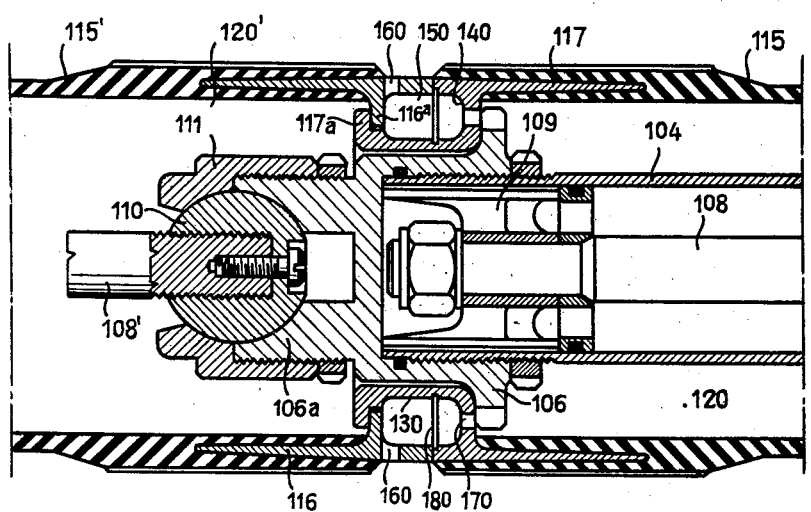
Fig. 2
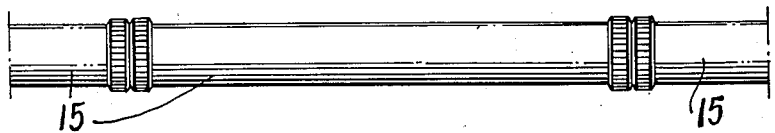

3,079,110
GROUND APPLIANCE FOR CONTROLLED DE-
CELERATION BRAKING OF AIRCRAFT ON
LANDING
Salvatore Maiorca, Turin, Italy, assignor to
Fiat Società per Azioni, Turin, Italy
Filed July 7, 1959, Ser. No. 825,559
Claims priority, application Italy Aug. 8, 1958
4 Claims. (Cl. 244—110)

This invention relates to a ground appliance for controlled deceleration braking of aircraft on landing.

Various ground braking devices for aircraft are known which are not, however, capable of satisfactorily solving the problem of shortened landing.

This problem may be proposed as follows:

The factor setting limits to shortened landing is the maximum deceleration to which the aircraft may be submitted, Once the highest admissible deceleration value is set, ideal landing requires the highest admissible deceleration to be maintained constant, To this end the braking force acting in a direction opposite the aircraft movement should be of a constant value.

The difficulty resides in maintaining this force constant as the aircraft speed varies or, better said, decreases.

Mechanical brakes of conventional winch and rope systems are hardly suited for the purpose.

A landing mattress of the "Zelman" type is further known, which comprises a plurality of pneumatic cushions of rubber arranged side by side to form a landing surface such as of 24 m. width, 150 m. length and about 1 m. height. The individual air hoses are covered by a plurality of cloth layers attached to the ground. Two complex hydro-mechanical devices are arranged laterally of the mattress and have connected therewith a cable extending through the mattress for coupling with the aircraft.

The aircraft lands with a retracted undercarriage and slides by the bottom of its body on the mattress. To this end the bottom of the body should be made rather flat, the wings being in a raised position. Apart from special structural features required of aircraft for landing on a pneumatic mattress, this arrangement is rather elaborate, hence expensive, considering also accessories essential to its operation, such as centrifugal blowers for inflating and a number of appliances for transport.

Arrangements are further known which are based on absorption of power by the traction of a piston freely coupled in a conical tube filled with liquid. However, arrangements of this kind are employed for stopping the aircraft rather than for shortened landing. For such arrangement come into action over the last 50 meters out of about 300 meters over which the aircraft rolls on the ground before stopping.

This invention provides a device of the cylinder and piston type which affords a controlled, more particularly constant deceleration during landing of the aircraft and is substantially cheaper is construction than prior devices.

The improved ground installation for controlled deceleration braking of aircraft on landing comprises two equal chains of telescopic hydraulic shock absorbers, the two movable members (cylinder and piston respectively), of each shock-absorber being each connected to a movable member of one adjacent shock-absorber, each chain being attached at one end to a fixed point on one side of the landing track and at its other end to a member common to both chains for coupling with a hook carried by the aircraft, the said shock-absorber exerting differential braking actions, whereby the aircraft to be braked on coupling with the device causes the shock-absorbers to sequentially stretch at an increasing braking force till the aircraft stops.

Further characteristic features of this invention will be understood from the appended detailed description referring to the accompanying drawings which show constructions by way of example. On the drawings:

FIGURE 2 is a fragmentary view illustrating a length of one chain seen from the outside.

FIGURE 4 is a sectional view on line IV—IV of FIGURE 3,

FIGURE 5 is a sectional view on line V—V of FIGURE 3, and

FIGURE 6 is a sectional view similar to FIGURE 3 showing a modification.

FIGURE 1 shows the landing field on which the landing track is outlined by lines A.

Figure 1:
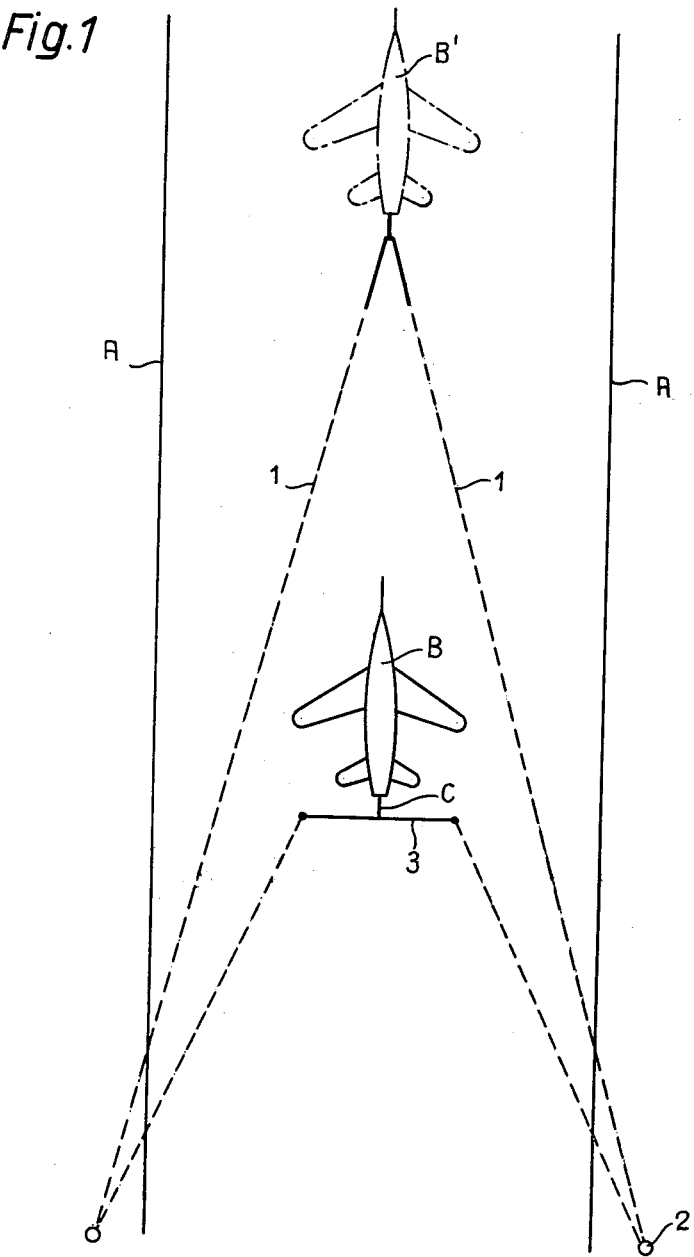
FIGURE 1 is a plan view of the device installed on a landing field.
Figure 3:
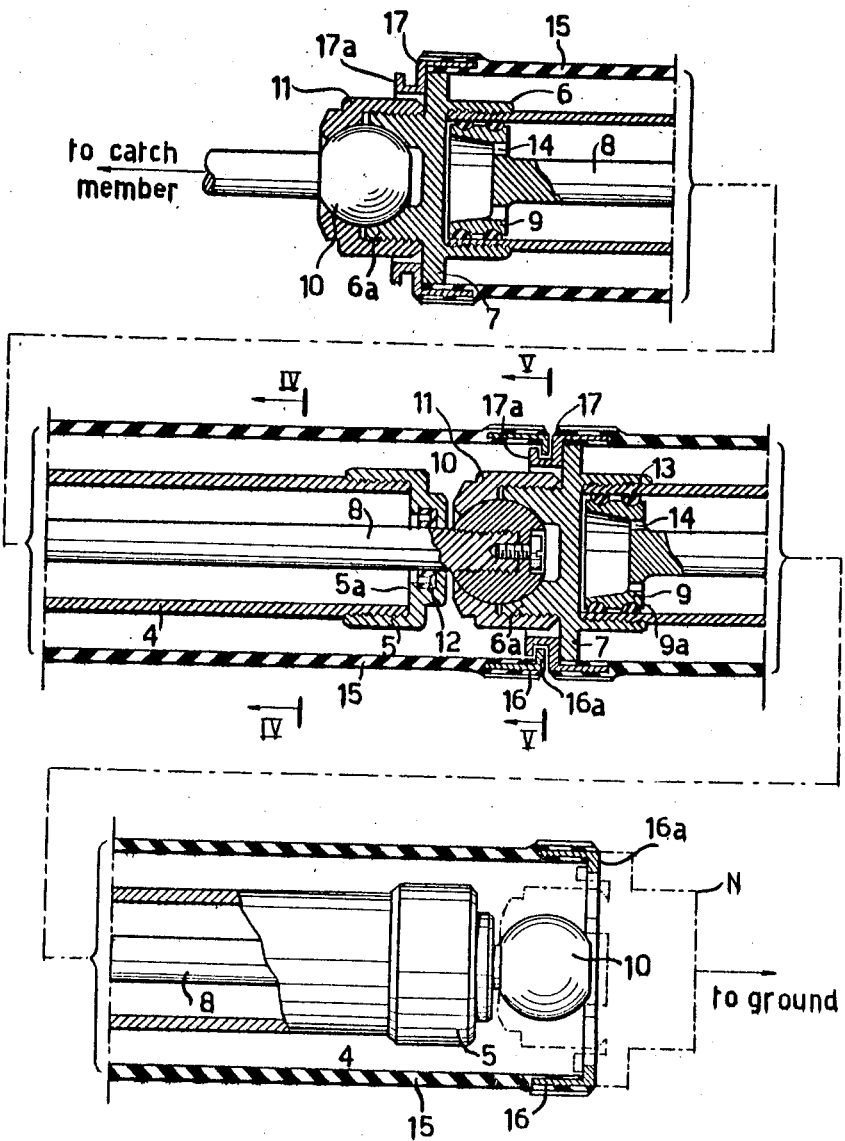
FIGURE 3 is a longitudinal sectional view of a chain length on an enlarged scale illustrating the inner structure of successive energy absorbers and their relation to the pendant or catch member and the ground.

B denotes the aircraft in its coupled position by means of a hook C to the braking appliance according to this invention, aircraft stopping at B'.

The controlled deceleration braking appliance comprises two equal chains 1 of telescopic hydraulic shock-absorbers, the movable members of each shock-absorber being each connected with a movable member of one adjacent shock-absorber. The chains are each attached at one end at 2 to a fixed point on one side of the landing track, and at their other end to a member 3 common to both chains for coupling with the hook C carried by the aircraft. The member 3 can be in the form of a steel cable length normally extending transversely of the track.

The shock-absorbers each comprise a cylinder 4 closed at one end by a cap closure 5 and at its other end by a cap 6 provided with a flange 7 and attachment means to the rod of the adjacent shock-absorber.

The rod 8 of each telescopic shock-absorber is securely fixed at one end to the piston 9 and screwed at its other end into a ball 10 accommodated by a spherical seating formed in part in an annular extension 6a on the cap of the adjacent cylinder and in a screw-threaded collar 11, respectively, screwed on the said annular extension 6a.

The rod 8 is sealed by a packing 12, packings 13 being provided for sealing the piston 9.

Throttling ports are bored in each piston, the ports in the successive absorbers in each chain having progressively decreasing cross-sectional areas in the direction away of the catch member 3 thereby to produce a sequential extension of the absorbers under a pull of aircraft on the member on landing. In such a sequential extension the two companion energy absorbers attached to the catch member 3 extend first because they have the largest ports therein, whereby the instantaneous inertial load encountered by aircraft is substantially negligible.

In operation the aircraft is coupled with the mooring member 3 and first causes the first shock-absorber pair of each chain having throttling ports of larger diameter to stretch, the aircraft speed decreasing. On completion of stretching of the first shock-absorbers, the face 9a of their respective pistons comes into contact with the inner surface 5a of their end caps 5, whereby the said first shock-absorbers behave as rigid non-extensible links. The ports 14 in the said first shock-absorbers are of course designed to confer to the aircraft the desired deceleration.

On completion of stretching of the first shock-absorber of each chain a further pair of shock-absorbers comes into action, which is so calibrated as to cause at the modified speed now taken by the aircraft as a result of braking by the first pair of shock-absorbers, a similar reaction as the first two shock-absorbers, so as to maintain deceleration constant and still at the desired value as before.

The successive shock-absorbers sequentially come similarly into action till the aircraft is stopped.

In describing the operation of the shock-absorbers it was assumed that the shock-absorbers of each chain sequentially come into action as the previous-shock-absorber in the chain has completed stretching. However, it will be obvious that under the traction by the aircraft a slight oil flow takes place in each absorber from the beginning, the extent of flow being smaller than in the operative shock-absorber on account of the differential cross-sectional area of the throttle ports.

According to a most advantageous embodiment of this invention, the throttling ports are dimensionally related to each other with a view of producing a substantially constant braking force over a minimum possible landing distance. Since an average fighter pilot is capable of safely supporting on landing a deceleration $a=3g$ ($g$ being the gravity acceleration), the braking force F corresponding to said minimum distance will be expressed by: $F=m \times a$, wherein $m$ is the mass of the aircraft. On the other hand, according to Bernouilli's theorem applied to energy absorbers described hereinbefore, the hydraulic braking force $F_h$ developed by an absorber is a direct quadratic function of the efflux speed of the hydraulic liquid through the throttling ports and is therefore expressed by a formula:

$$F_h = k\frac{V^2}{A}$$

wherein V is the speed of the piston in the cylinder at the instant in which the energy absorber is extended under the pull of aircraft on the catch member and A is the area of the throttling ports in the piston. It is to be pointed out that, in the appliance according to this invention, V is also the instantaneous speed of the aircraft and $F_h$ should result equal to F (which latter is desired substantially constant); thus, the areas of the throttling ports in the subsequent energy absorbers in each chain result related to the instantaneous speed values V according to the expression:

$$A = V^2.\text{const.}$$

wherein the term "const." takes care inter alia both of the mass of the aircraft and the maximum deceleration $a=3g$. Assuming the aircraft is 5,000 kgs. in weight and lands at an imposed speed $V_1$ of 230 km./h., the throttling apertures in the first two companion energy absorbers will be proportioned in order to develop a braking force of about 15,000 kgs. at the piston speed equalling $V_1$. As the two absorbers extend under the pull of aircraft, the speed of the latter sinks to a value $V_2$ which, with two-meter long energy absorbers, amounts to about 226 km./h.; at this moment a second pair of companion absorbers starts extending by having their throttling ports proportioned to give the above braking force (15,000 kgs.) at the speed value $V_2$ ($A_2=V_2^2.\text{const.}$), and so on. Under these conditions, with a number of 35–36 energy absorbers in each chain, the aircraft is arrested under constant deceleration of $3g$ within a space of about 70 meters within about 2.2 seconds.

The shock absorbers are each enclosed by a rubber sheath 15 incorporating at one end a ring 16 having a flange 16a formed with notches and at its other end a ring 17 having an annular extension 17a of U-shaped cross-section likewise formed with notches. The ring 16 on each shock-absorber is engaged after the manner of a bayonet-joint by the channel in each extension 17a on the rubber tube of the adjacent shock-absorber. The extension 17a provides moreover together with a radial flange 7 on the end cap 6 an axially effective one-way coupling means preventing the sheath 15 from being slipped from its associated cylinder 4 in the direction of the other end of the cylinder. The end cap 6 of the foremost absorber in each chain is connected to its respective end of the catch member whereby, in operation, the respective extension 17a is axially engaged by the flange 7 and is pulled forwardly together with the cap and cylinder. The bayonet-coupling member 16a on the rearmost sheath in each chain and the spherical joint member 10 on the rearmost energy absorber are both connected to the ground by means of a common nipple N, whereby the coaxial "strings" of energy absorbers and sheaths are extended under the pull of aircraft on the catch member 3 on landing.

The rubber hose fulfills the double function of protecting the appliance on sliding on the ground and acting as a resilient return member for restoring the shock-absorbers to their collapsed condition after stretching. Referring to the above numerical example it may be assumed that the rubber hoses 15 exert on full stretching a force of 500 kgs., which is fully negligible on the aircraft, but, considering its mean value, is such as to quickly restore the collapsed condition of the device for further use.

Since the reaction of the shock-absorbers is dependent upon the stretching speed, the appliance is advantageous in automatically suiting variations in aircraft speed within a wide range.

As both chains can be quickly taken to pieces, they can be easily forwarded in such disassembled condition from one place to another and quickly assembled for use. Of course, some excess shock-absorbers over the strictly necessary number should conveniently be available for the sake of safety.

In practice, the basic data are the imposed speed value $V_1$ on landing (such as 230 km./h., for example) and the braking force value $F=m\times a$, in which the factor $a$ may be considered constant ($=3g$, for example) and in which $m$ is the mass of the aircraft (average value for fighters: about 5,000 kgs.). The appliance described hereinbefore will be therefore composed of a number $2n$ energy absorbers taking care of the above average conditions, wherein the foremost pair of companion absorbers will be characterized each by a braking force of 7,500 kgs. at their extension speed of 230 km./h. (total force: 15,000 kgs.), and wherein the subsequent pair of companion absorbers will be characterized each by a braking force of still 7,500 kgs. but at a speed of, say, 226 km./h. (when two-meter long absorbers are employed), and so on. This means that the absorbers in the said subsequent pair will develop each a braking force of about 7,800 kgs. when stretched at the speed of 230 km./h. instead of 226 km./h.; thus, when aircraft requiring a braking force of 15,600 kgs. asks for a permission for landing it is sufficient to disconnect the first pair of absorbers and connect the second pair directly to the catch member thereby to obtain the desired fully safe result. It is therefore clear that this appliance is extremely versatile in use within wide limits, provided the number of energy absorbers in each chain is sufficient to give a total extension of, say, 75–100 meters necessary for a fully safe 3g-deceleration from an initial speed of 230–280 km./h.

FIGURE 6 shows an embodiment providing means for efficiently cooling the telescopic shock-absorbers and preventing access of foreign bodies, such as gravel, between the hoses and shock-absorbers, respectively.

In FIGURE 6, 104 denotes the cylinder of one shock-absorber in the chain, in which the piston 109 and piston rod 108 are movable. The cylinder 104 ends by a cap 106 having articulated thereto the rod 108' of the next shock-absorber. To this end the cap 106 is formed with an annular extension 106a provided with an outer screw-thread and at the front with a semi-spherical seating. The rod 108' ends by a ball 110 which is retained in the said seat by a screw-threaded collar 111 screwed on the extension 106a.

The shock-absorbers are enclosed by rubber hoses 115, 115' respectively, capable of resilient stretching, larger in inner diameter than the outer diameter of the cylinder 104, thereby forming an annular space 120, 120', respectively. The hoses 115, 115' are interconnected by means of metal rings 116, 117, respectively, incorporated by the hose ends to form a joint such as a bayonet joint. For this purpose the ring 116 is formed intermediate its length with an inner toothed rim having radial teeth 116a engaging behind corresponding radial teeth 117a provided on a tubular extension 130 on the ring 117. The extension 130 is appreciably smaller in diameter than the ring 117 and merges into the latter by an annular cross portion 140 which is somewhat backward of the free end of the ring.

The two rings 116, 117 thereby define together an annular chamber 150 connecting with the outside through radial holes 160 bored in the portion of the ring 116 between the toothed rim 116a and ring 117. The annular chamber 150 further connects with the annular space 120 through axial bores 170 bored in the cross wall 140 of the ring 117. The annular chamber 150 further accommodates a wire gauze 180 interposed on the path between the holes 160 and bores 170 to avoid access of foreign bodies to the chamber 120 when the shock-absorber chain slides on operation on the ground.

In operation extending and collapsing of the rubber hoses 115, 115' and shock-absorbers effect a pumping action; on extension air from the outside is drawn into the chamber 120, thereby cooling the shock-absorber and preventing crushing of the hose 115. On collapsing this air is expelled to the outside together with its heat content.

What I claim is:

1. In combination with a landing track an appliance for braking landing aircraft in a predetermined minimum distance on the track comprising a flexible elongated catch member normally extending across the track, and a pair of co-extensive braking chains freely laid on the ground lengthwise of the track at opposite longitudinal sides of the track connecting the opposite ends of said catch member to the ground; each of said braking chains comprising a string composed of a plurality of series-connected hydraulic telescopic energy absorbers telescopically extensible over said distance under a pull of aircraft on the catch member on landing thereby to apply a hydraulic braking force on the respective end of the member, and a string composed of a similar plurality of series-connected tubular sheaths of elastomeric material resiliently extensible over said distance under said pull of aircraft on the member in an arrangement wherein each of the energy absorbers is normally housed within its respective sheath and wherein the string of sheaths provides resilient means developing a force capable of returning the string of energy absorbers to its battery position but uncapable per se of braking the aircraft within said distance; each of the telescopic energy absorbers comprising a cylinder and a ported piston reciprocable in the cylinder, the piston ports in the successive absorbers in each chain having progressively decreasing cross-sectional areas in the direction away from the catch member thereby to produce a sequential extension of the absorbers under said pull of aircraft on the member.

2. In the appliance as claimed in claim 1, coupling means on opposite ends of each of the tubular sheaths series-connecting the sheaths in each string of sheaths, and said coupling means comprising venting passages through said coupling means for venting the inside of the sheaths in operation.

3. In the appliance as claimed in claim 1, a cylinder head on one end of each of the cylinders, a piston rod protruding from the other end of each of the cylinders, and a spherical joint means connecting piston rods of individual energy absorbers to the cylinder head of the adjoining energy absorber in each of the strings.

4. In the appliance as claimed in claim 3, one-way abutment means on the cylinder head and the respective sheath end preventing the sheath from being slipped-off from the cylinder in the direction of the other end of the cylinder.

References Cited in the file of this patent

UNITED STATES PATENTS

| 343,946 | Chamberlayne | June 15, 1886 |
| 1,802,649 | Heinkel | Apr. 28, 1931 |
| 2,151,704 | King | Mar. 28, 1939 |
| 2,789,780 | Cotton et al. | Apr. 23, 1957 |
| 2,936,977 | Ballard et al. | May 17, 1960 |
| 2,977,075 | Haber | Mar. 28, 1961 |

FOREIGN PATENTS

| 1,057,883 | Germany | May 21, 1959 |